(12) United States Patent
Schmitt et al.

(10) Patent No.: US 7,808,374 B2
(45) Date of Patent: Oct. 5, 2010

(54) BRAKE LINING WEAR SENSOR

(75) Inventors: Hans-Michael Schmitt, Muennerstadt (DE); Martin Blaufuss, Suelzfeld (DE); Bernhard Knuettel, Bad Neustadt (DE)

(73) Assignee: PREH GmbH (DE)

( * ) Notice: Subject to any disclaimer, the term of this patent is extended or adjusted under 35 U.S.C. 154(b) by 8 days.

(21) Appl. No.: 12/330,170

(22) Filed: Dec. 8, 2008

(65) Prior Publication Data

US 2009/0177362 A1 Jul. 9, 2009

Related U.S. Application Data

(63) Continuation of application No. PCT/EP2007/004975, filed on Jun. 5, 2007.

(30) Foreign Application Priority Data

| Jun. 7, 2006 | (DE) | ................ 10 2006 026 833 |
| Jun. 5, 2007 | (DE) | ................ 10 2007 026 463 |

(51) Int. Cl.
  *B60Q 1/00* (2006.01)
  *G01L 5/28* (2006.01)
(52) U.S. Cl. .................. 340/454; 340/453; 73/121; 73/132
(58) Field of Classification Search ............ 340/454, 340/453; 72/121, 132
See application file for complete search history.

(56) References Cited

U.S. PATENT DOCUMENTS 5,689,159 A * 11/1997 Culp et al. ............ 318/400.18
6,211,794 B1 * 4/2001 DeSoto ..................... 340/686.1
6,412,607 B2 * 7/2002 Ohba et al. ................ 188/71.9
2002/0144555 A1 * 10/2002 Schenk, Jr. .................. 73/779
2003/0042084 A1 * 3/2003 Kawase et al. ............. 188/72.1

FOREIGN PATENT DOCUMENTS

| DE | 30 10 498 A1 | 9/1981 |
| DE | 196 37 394 A1 | 3/1998 |
| DE | 198 17 356 A1 | 10/1999 |
| DE | 101 32 968 A1 | 1/2003 |
| DE | 103 05 702 A1 | 10/2003 |
| EP | 0 492 143 A1 | 7/1992 |
| EP | 0 566 006 A1 | 10/1993 |
| EP | 0566006 A1 * | 10/1993 |

* cited by examiner

*Primary Examiner*—Benjamin C Lee
*Assistant Examiner*—Andrew Bee
(74) *Attorney, Agent, or Firm*—Cantor Colburn LLP

(57) ABSTRACT

An apparatus is provided for measuring wear-induced displacement of a brake lining with respect to an associated brake caliper, comprising a gear mechanism for converting the wear-induced displacement into a rotary movement, having a sensor for detecting the rotary movement, wherein a contact-free coupling is provided for transmitting the rotary movement to the sensor. The apparatus is designed in such a way that the sensor generates an analogue or pulse-width-modulated detection signal for determining the wear-induced displacement of the brake lining, wherein the detection signal corresponds to the respective displacement caused by the rotary movement. The invention also related to a corresponding method for measuring the wear-induced displacement of a brake lining with respect to an associated brake caliper.

13 Claims, 3 Drawing Sheets

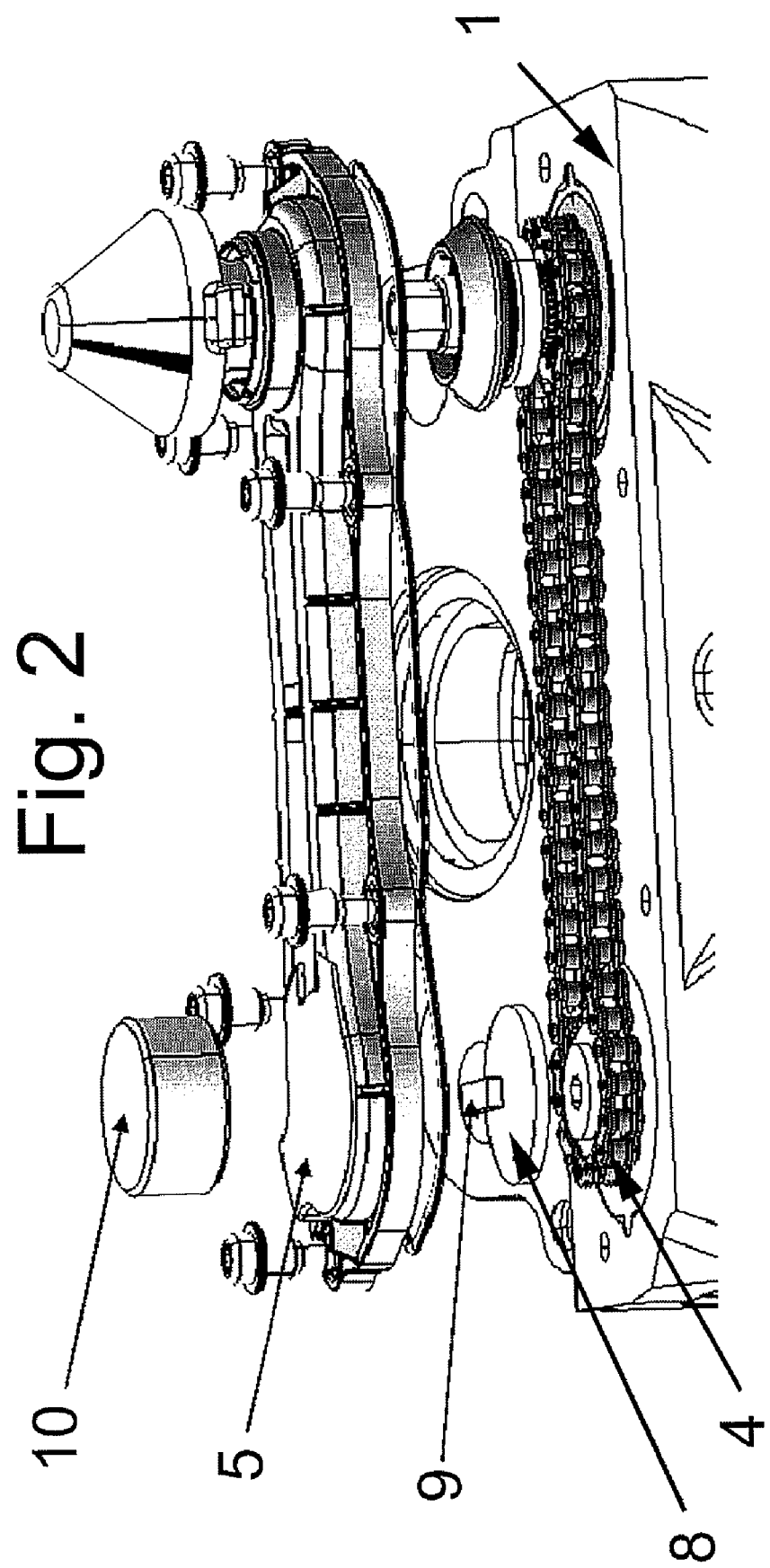

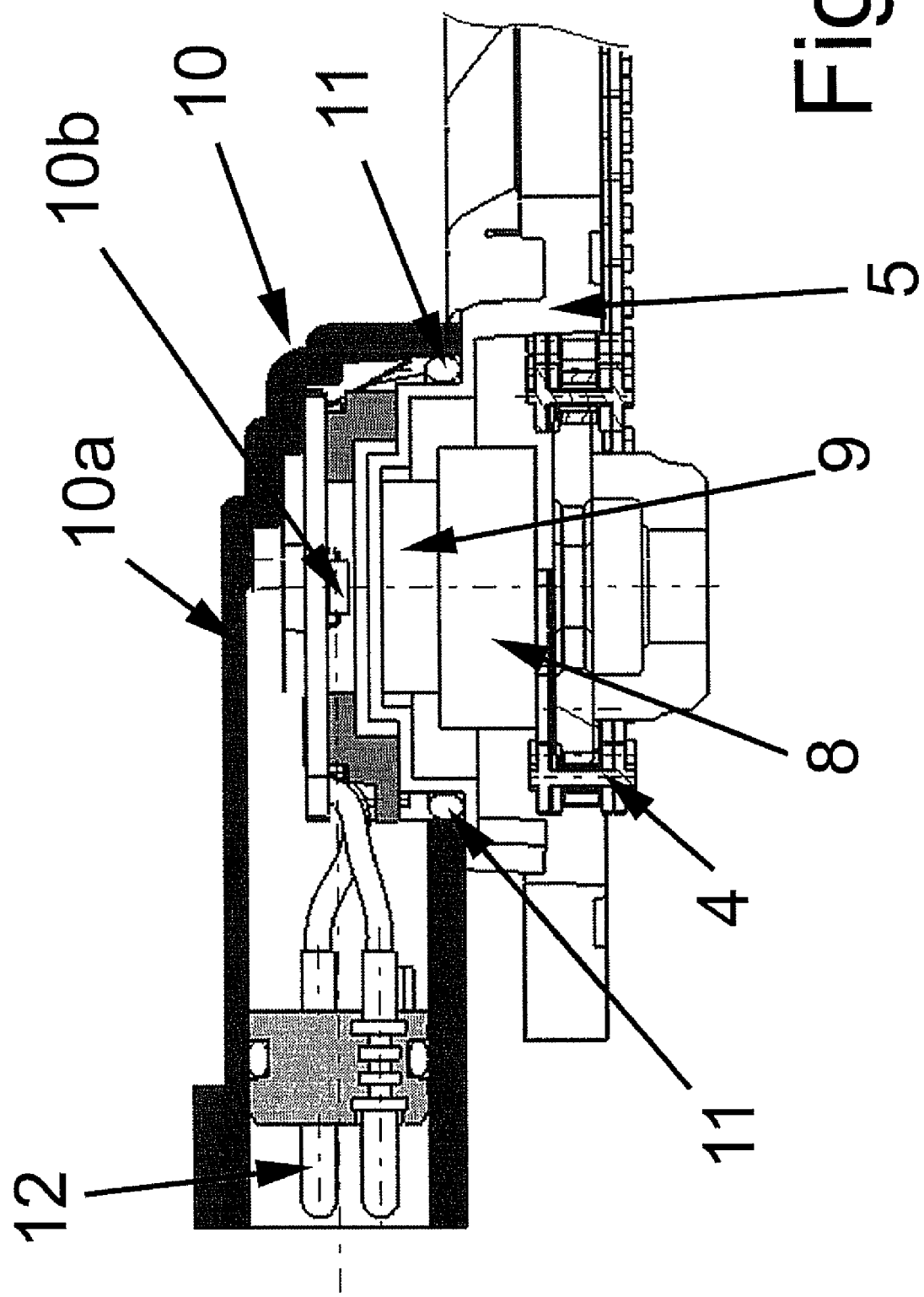

BRAKE LINING WEAR SENSOR

This nonprovisional application is a continuation of International Application No. PCT/EP2007/004975, which was filed on Jun. 5, 2007, and which claims priority to German Patent Application Nos. DE 10 2006 026 833.4 which was filed in Germany on Jun. 7, 2006 and DE10 2007 026 463.3, which was filed in Germany on Jun. 5, 2007, and which are both herein incorporated by reference.

BACKGROUND OF THE INVENTION

1. Field of the Invention

The invention relates to a sensor for contactless detection of wear in a brake lining of a motor vehicle, wherein the wear-induced displacement of the brake lining relative to the brake caliper or the displacement range of a mechanical or electromechanical adjuster for compensating the brake lining wear is determined for a subsequent electronic analysis device and/or warning device.

2. Description of the Background Art

Such systems are known. Thus, DE 101 32 968 A1 discloses a potentiometer with a straight-line resistive track in which a wear-induced displacement of the brake lining is communicated to the resistive track by linear motion. A disadvantage in this system is that the communication is not "contactless," which is to say that the motion is communicated directly to the potentiometer by mechanical coupling. This mechanical coupling has the result that separating the sensor from the brake caliper in order to service the brake or replace a lining is very complicated, if it is possible at all, and may require readjustment of the sensor.

In contrast, DE 196 37 394 discloses a "contactless" measurement of brake lining wear. Thus, a Hall sensor is provided on a brake caliper and a magnet is provided on the brake piston. The relative linear displacement between the piston and brake caliper caused by the wear is determined by means of the resulting change in the magnetic field. While a "contactless" measurement is indeed disclosed, it is not proposed in order to simplify maintenance.

Both the embodiments described above have in common that the wear-induced linear displacement between the brake lining and brake caliper is determined directly. This requires a particularly high detection precision of the sensor and the associated measurement mechanism in order to be able to reliably detect the comparatively small wear displacement.

In order to increase the detection precision, it is thus advantageous to measure the brake lining wear by the means that a transmission is present that converts the linear motion of the wear-induced brake lining displacement into a rotary motion that can be detected with better resolution. To this end, it is possible to attach the sensor to the adjusters that are customarily present, since the customary adjusters are generally based on a rotary motion of a motor being translated, in particular geared down, into a linear displacement of the brake lining. In this context, the practitioner of the art encounters the problem that the limited range of measurement of a potentiometer or Hall sensor makes detection very difficult or impossible. In this regard, DE 103 05 702 discloses an electric-motor-driven displacement or adjustment of a brake lining, wherein the associated actuating motor has a decoder disk with multiple alternating magnetized areas on one of its shafts for detecting its rotary motion, the motion of said magnetized areas being detected by the switching on and off of multiple Hall sensors, which is to say digitally. Since no detection signal is produced that unambiguously corresponds to the relevant position resulting from the rotary motion, relatively complicated analysis logic is necessary, and complicated readjustment is required during maintenance, in particular after brake lining replacement.

SUMMARY OF THE INVENTION

It is thus an object of the present invention to provide a device for measuring the wear-induced displacement of a brake lining relative to an associated brake caliper which is relatively economical, is easy to maintain, and permits a relatively precise and reliable measurement.

The inventive device for measuring the wear-induced displacement of a brake lining with respect to an associated brake caliper can be comprised of a transmission for translating the wear-induced displacement into a rotary motion. The conversion of this generally linear, but above all small, relative displacement or motion between the lining and caliper into a rotary motion, makes possible a more precise detection by the sensor that is also provided in accordance with the invention. One reason for this is that a rotary motion is easier to detect, and another reason is that the reduction ratio can be or is easily adjusted such that the comparatively small linear motion is associated with a comparatively large rotary excursion. For contactless communication of the rotary motion to the sensor, a contactless coupling, for example a clutch based on magnetic forces, is provided. For example, the coupling can be achieved by an electromagnetic field acting on the sensor whose change based on the lining displacement is detected by the sensor, for example by means of the Hall principle. This achieves the result that no mechanical connection is needed between the sensor and the means for producing the rotary motion. This makes maintenance easier, since there is no need for mechanical separation of this connection. For example, the sensor is arranged in a housing detachably connected to the brake caliper, and the contactless coupling occurs in the transition region between this housing and the brake caliper. Because of the contactless coupling, there is no need for any mechanical connecting means, such as clutches, and no need to provide openings for this purpose in the brake caliper or its housing or in the housing of the sensor. This makes maintenance easier. Moreover, a sensor can easily be retrofitted. Furthermore, the housing of the brake caliper is not weakened or subjected to dirt accumulation on account of the opening that otherwise would be provided. In addition, the sensor can thus be removed from the brake caliper nearly "remainder-free," which is to say without openings remaining in the caliper, as needed.

Moreover, the device is designed according to the invention such that the sensor generates an analog or pulse-width modulated detection signal for determining the wear-induced displacement of the brake lining, wherein said signal corresponds to the particular position produced by the rotary motion. Maintenance work is made a great deal easier by the use of a pulse-width modulated signal, in particular an analog signal. Another result is that the sensor is easy to adjust, economical to produce, and especially reliable. One reason for this is that there is no need for another calibration process following a temporary power failure or disruptive power fluctuation, such as is generally necessary in the case of digital detection. Advantageously the device is designed such that only one sensor is required to detect the displacement, with the result that the device can be produced economically.

In an embodiment, the sensor can be a rotary potentiometer and the contactless coupling can be a clutch based on magnetic forces, wherein, for example, a shaft of the transmission that rotates in accordance with the displacement motion of the lining is provided with a transmitter magnet that carries along a rotatably mounted receiver magnet on the sensor side. The rotary motion is communicated to the rotary potentiometer, wherein the resistance that is established in each particular case corresponds to the displacement of the brake lining, and can be detected by means of an associated detection signal.

The adjustment range of the rotary potentiometer, or of the transmission, is matched to the maximum expected displacement range of the brake lining. This results in a particularly economical to manufacture and particularly reliable device, which is particularly insensitive to interfering magnetic fields.

According to another embodiment, an alternative to the aforementioned embodiment, the sensor is a Hall sensor and the contactless coupling is accomplished by means of a magnetic field that changes as a result of the rotary motion and acts on the Hall sensor. For instance, this can be an AMR sensor, preferably a GMR sensor because of the reduced susceptibility to interference. Even more preferably, it is a Hall sensor with a freely programmable transfer function between magnetic field input and detection signal output, which is especially reliable, and is easy to adjust because of the programmable transfer function.

By way of example, a transmitter magnet can be arranged on the terminal shaft of the transmission. Its magnetic field acts on the Hall sensor. In the event of displacement induced by the wear, at least one rotation of the magnet and the associated magnetic field occurs relative to the orientation of the Hall sensor, which is associated with a change in the Hall voltage and possibly a polarity change of the Hall voltage in the sensor. If the Hall sensor and magnet are not aligned coaxially to one another, the rotation will also be accompanied by a separation between the magnet and sensor, which likewise leads to a change in Hall voltage, and is used for detection in one embodiment. With such an embodiment, it is possible to create a device that is reliable because it is wear-resistant, is stable over the long term, and is insensitive to temperature. The transmission and Hall sensor are arranged and laid out such that the range of magnetic field orientation that can be detected by the Hall sensor, namely 120° for a standard Hall sensor and 180° for a GMR or AMR Hall sensor, can be utilized as fully as possible, thus optimizing measurement precision.

In another embodiment, an analog signal value of the sensor can be uniquely associated with each wear-induced displacement of the brake lining. Calibration processes can advantageously be omitted as a result.

In yet another embodiment, the transmission can be at least a part of a mechanical or electromechanical adjuster of the brake lining. These adjusters are present in nearly all vehicles, and generally have rotating shafts. As a result, the prior art brakes can easily be retrofitted with the inventive device without the integrity of the brake being impaired for the aforementioned reasons. By way of example, the adjuster comprises a chain gear composed of chain and pinion, driven either by electric motor or mechanically.

In another embodiment, the device for measuring the wear comprises an additional reducing gear between the transmission, for example the adjuster, and the sensor. This reducing gear serves to adjust the range of rotation of the transmission, for example of the transmitter magnet, to the measurement range detectable by the sensor. In order to keep the space requirement for this reducing gear small, it is preferably a planetary gear set. For example in the case of the rotary potentiometer, the reducing gear is located on the sensor side, which is to say between the magnetic clutch and the sensor; in an embodiment with a Hall sensor, the reducing gear is located on the brake caliper side, which is to say between the transmission of the adjuster and that of the magnet producing the magnetic field.

In another embodiment, the sensor and if applicable the reducing gear are located in a housing that is detachably connected to the brake caliper, wherein the contactless coupling serves to transmit the rotary motion into the housing. As a result of the detachable connection, which is to say the modular construction achieved thereby, simple maintenance is ensured. Because of the contactless coupling, no connection between the brake caliper and sensor is needed for it, and thus also no additional openings in the brake caliper housing. Manufacturing costs for the brake caliper housing either are not affected at all, or are worsened only insignificantly. In addition, retrofitting with the inventive device is made easier. Since no openings need to be made in the brake caliper housing, its stability and protection from external effects, such as rainwater and the like, are not impaired.

The invention also relates to a brake for a motor vehicle, preferably for a utility vehicle, and also concerns a motor vehicle that is equipped with the above-described device. The device-related advantages thus also concern the brake and the motor vehicle.

The invention also concerns a method for measuring the wear-induced displacement of a brake lining with respect to an associated brake caliper, wherein the wear-induced displacement is translated into a rotary motion by means of a transmission. The rotary motion is communicated by a contactless coupling to the sensor for detecting the rotary motion. The method is characterized in that the sensor generates an analog or pulse-width modulated detection signal for determining the wear-induced displacement of the brake lining, wherein the detection signal corresponds to the specific displacement produced by the rotary motion. This conversion of the generally linear, but above all small, relative displacement or motion between the brake lining and brake caliper into a rotary motion, makes possible a more precise detection by the sensor that is also provided in accordance with the invention. One reason for this is that a rotary motion is easier to detect, and another reason is that the reduction ratio can be or is easily adjusted such that the comparatively small linear motion is associated with a comparatively large rotary excursion. The contactless coupling achieves the result that no mechanical connection is needed between the sensor and the means for producing the rotary motion. This makes maintenance easier, since there is no need for mechanical separation of this connection in order to remove the sensor from the brake caliper.

In an embodiment, the detection signal can be additionally analyzed in order to emit a warning and/or to influence brake control. In order to increase immunity to interference, the analog or pulse-width modulated detection signal can be subjected to additional processing by an overvoltage protection circuit, ESD protection circuit, and/or EMC protection circuit before it is fed to the actual analysis unit. Such circuits are integrated in Hall sensors of the latest design, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 illustrates an exploded perspective view of a second embodiment of the inventive device with the associated brake caliper; and FIG. 3 illustrates a cross-sectional representation of the embodiment shown in FIG. 2.

DETAILED DESCRIPTION

Figure 1:
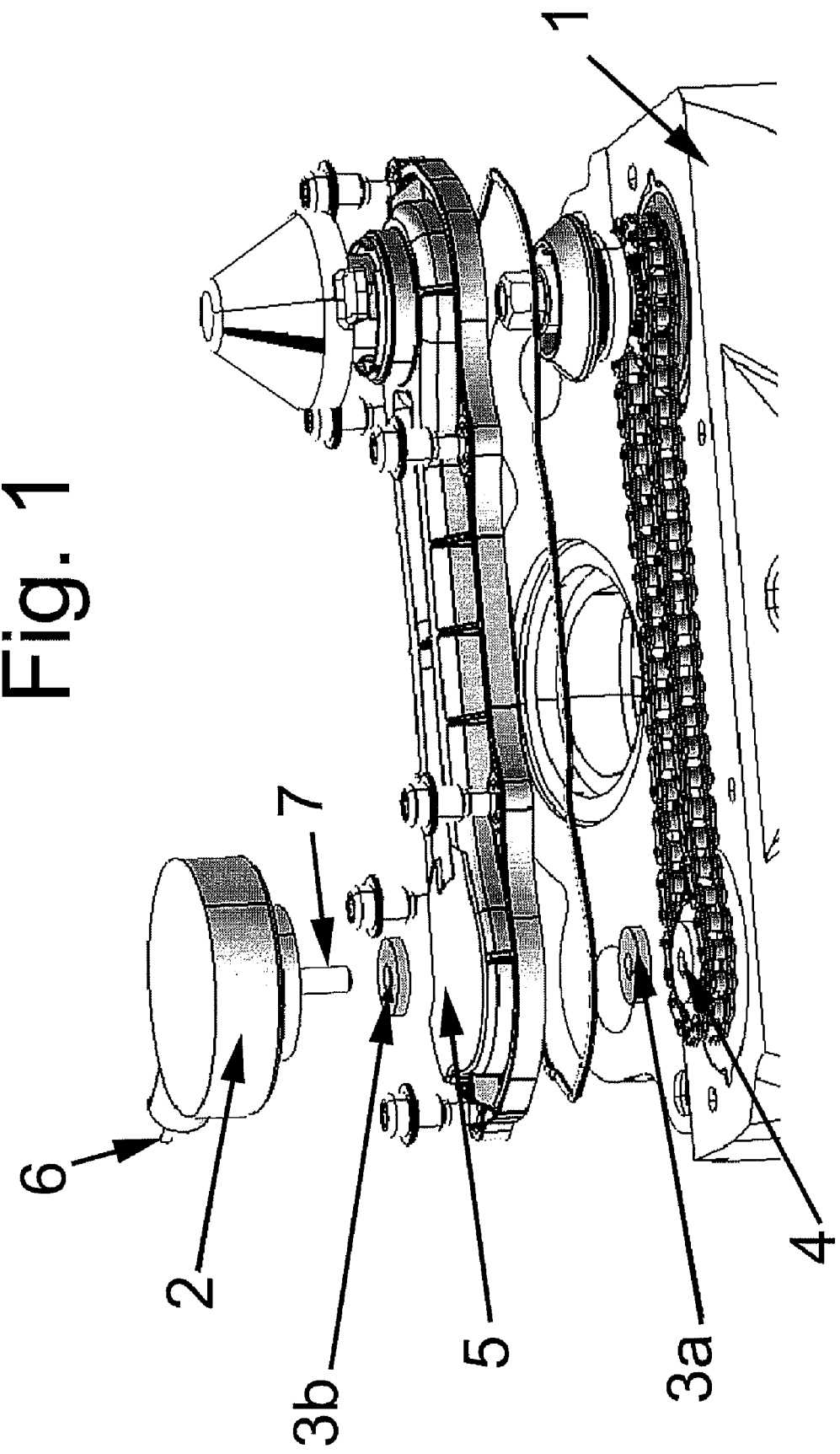
FIG. 1 illustrates an exploded perspective view of a first embodiment of the inventive device with the associated brake caliper.

FIG. 1 shows a brake caliper 1 with a mechanical adjuster shown thereon, which also can be implemented as an electromechanical adjuster, having a transmission 4 including a chain and pinions to compensate the brake lining wear. The brake lining and the associated actuation cylinder are not shown for reasons of clarity. The transmission 4 comprises a shaft shown in the vicinity of the arrow 4, which shaft moves relative to the brake caliper proportionally to the wear-induced displacement. This rotation is communicated to a sensor 2, for which purpose a contactless coupling is provided, including a pair of magnets 3a, 3b. The transmitter magnet 3a is attached to the shaft and its magnetic force acts, through the housing 5 of the brake caliper or the adjuster, on a receiver magnet 3b located outside the housing 5, which in turn is attached to a rotatable shaft 7. The magnetic clutch consisting of the magnets 3a and 3b is responsible for communicating the rotation of the shaft 4 of the adjuster 4 to the shaft 7 of the sensor 2. The sensor 2 is a rotary potentiometer integrated in a housing, which is moved by means of the rotatable shaft 7. In order to match the range of rotation of the adjuster 4 to the potential range of rotation of the potentiometer, an optional reducing gear (not shown) is provided, which is integrated in the housing of the sensor 2 and which gears down the rotation of the adjuster 4 during transmission to the rotary potentiometer of the sensor 2. The rotary potentiometer is connected by the connection 6 to an analysis unit (not shown). Since the rotary potentiometer of the sensor 2 has a resistor whose value depends on rotational position, this can easily be used to generate an analog detection signal (voltage or current) corresponding to the rotary position.

Shown in FIG. 2 is another embodiment of the inventive device for attachment to the brake caliper 1 known from FIG. 1 with a mechanical adjuster shown thereon with a transmission 4 composed of a chain and pinions for compensating the brake lining wear. Once again, the brake lining and the associated actuating cylinder are not shown for reasons of clarity. The transmission 4 comprises a shaft shown in the vicinity of the arrow 4, which shaft moves relative to the brake caliper proportionally to the wear-induced displacement. This rotation is communicated to a sensor 10. In order to adjust the scope of the rotary motion of the adjuster 4 to the range of rotation measurable by the sensor 10, a reducing gear 8 is provided that is integrated into the housing 5 of the brake caliper 1 or into the adjuster 4. This is a planetary gear set. In this way, the rotation of the shaft of the adjuster 4 is geared down during transmission to the sensor 10. For contactless coupling, a magnet 9 is attached to the reducing gear 8 such that it rotates with the rotation of the adjuster 4 according to the reduction ratio. The magnetic field of the magnet 9 acts through the housing 5 of the brake caliper or the adjuster on the sensor 10 located outside the housing 5. This sensor is a Hall sensor. The magnetic field, which changes as a result of the motion, causes a change in the Hall voltage in the Hall sensor. The strength of the magnetic field, and thus the associated Hall voltage, decreases with increasing separation. Likewise, a change in the orientation of the magnetic field resulting from the rotation relative to the sensor can cause a change in the Hall voltage, including its polarity. With a small number of experiments, a practitioner of the art will be able to achieve an optimal orientation between the magnet, which is to say its magnetic field, and the sensor in order to achieve an unambiguous association between rotary position and the detection signal of the sensor.

FIG. 3 shows a cross-sectional view of the embodiment shown in FIG. 2. The construction of the sensor 10 and its attachment to the housing 5 of the brake caliper or the adjuster 4 are visible here. The sensor 10 has, located in a housing 10a, a Hall sensor 10b on which the magnetic field of the magnet 9 acts through the housing 5. The magnet 9 rotates in proportion to the shaft of the adjuster 4, but geared down by the reduction gear 8, which is a planetary gear set for reasons of space. The sensor 10 can be connected to an analysis unit by plug contacts 12 integrated into the housing 10a of the sensor. The sensor 10 is connected to the brake caliper or the adjuster 4 only by the mechanical connection between the sensor housing 10a and the housing 5 of the adjuster, in that it is placed thereon and is sealed by an O-ring 11. This simplifies maintenance and adjustment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for measuring wear-induced displacement of a brake lining with respect to an associated brake caliper, the device comprising:
   a transmission for translating the wear-induced displacement into a rotary motion;
   a sensor for detecting the rotary motion;
   and a contactless coupling for communicating the rotary motion to the sensor,
   wherein the sensor is configured to generate an analog or pulse-width modulated detection signal for determining the wear-induced displacement of the brake lining, the detection signal corresponding to a specific displacement produced by the rotary motion;
   wherein the sensor is located in a housing that is detachably connected to the brake caliper, and
   wherein a reduction gear is disposed at an exterior of the housing to gear down the rotary motion prior to the communication thereof to the sensor.

2. The device according to claim 1, wherein the sensor is a rotary potentiometer and the contactless coupling is a clutch based on magnetic forces.

3. The device according to claim 1, wherein the sensor is a Hall sensor and the contactless coupling includes a magnetic field that changes as a result of the rotary motion and acts on the Hall sensor.

4. The device according to claim 1, wherein an analog signal value of the sensor is uniquely associated with the wear-induced displacement.

5. The device according to claim 1, wherein the transmission is at least a part of a mechanical or electromechanical adjuster of the brake lining.

6. The device according to claim 1, wherein the reduction gear is provided between the transmission and the sensor.

7. The device according to claim 1, wherein the coupling serving to communicate the rotary motion into the housing.

8. A brake for a motor vehicle, the brake comprising a device for measuring the wear-induced displacement of a brake lining, the device comprising:
   a transmission for translating the wear-induced displacement into a rotary motion;
   a sensor for detecting the rotary motion; and
   a contactless coupling for communicating the rotary motion to the sensor,
   wherein the sensor generates an analog or pulse-width modulated detection signal for determining the wear-induced displacement of the brake lining, the detection signal corresponding to a particular displacement produced by the rotary motion;
   wherein the sensor is located in a housing that is detachably connected to a brake caliper, and
   wherein a reduction gear is disposed at an exterior of the housing to gear down the rotary motion prior to the communication thereof to the sensor.

9. A motor vehicle comprising a brake for measuring the wear-induced displacement of a brake lining, the brake comprising:
   a transmission for translating the wear-induced displacement into a rotary motion;
   a sensor for detecting the rotary motion; and
   a contactless coupling for communicating the rotary motion to the sensor,
   wherein the sensor generates an analog or pulse-width modulated detection signal for determining the wear-induced displacement of the brake lining, the detection signal corresponding to a particular displacement produced by the rotary motion;
   wherein the sensor is located in a housing that is detachably connected to a brake caliper, and
   wherein a reduction gear is disposed at an exterior of the housing to gear down the rotary motion prior to the communication thereof to the sensor.

10. A method for measuring wear-induced displacement of a brake lining with respect to an associated brake caliper, the method comprising:
    translating the wear-induced displacement into a rotary motion by a transmission;
    gearing down the rotary motion by a reduction gear;
    communicating the rotary motion by a contactless coupling to a sensor, located in a housing detachably connected to the brake caliper, for detecting the rotary motion, the sensor configured to generate an analog or pulse-width modulated detection signal for determining the wear-induced displacement of the brake lining, the detection signal corresponding to a specific displacement produced by the rotary motion; and
    wherein the reduction gear is disposed at an exterior of the housing.

11. The method according to claim 10, wherein the detection signal is additionally analyzed in order to emit a warning and/or to influence the brake control.

12. The device according to claim 7, wherein the housing is hermetically sealed.

13. A device to measure wear-induced displacement of a brake lining with respect to an associated brake caliper, the device comprising:
    a transmission for translating the wear-induced displacement into rotary motion;
    a reduction gear to gear down the rotary motion;
    a sensor for detecting the geared down rotary motion to generate a detection signal for determining the wear-induced displacement of the brake lining, the detection signal corresponding to a specific displacement produced by the geared down rotary motion;
    a contactless coupling for communicating the geared down rotary motion to the sensor; and
    a housing, detachably connected to the brake caliper, to house the sensor with the reduction gear disposed at an exterior of the housing and with the contactless coupling communicating the geared down rotary motion into the housing.

* * * * *